(12) United States Patent
Hou

(10) Patent No.: US 8,378,614 B2
(45) Date of Patent: Feb. 19, 2013

(54) FAN CONTROL CIRCUIT

(75) Inventor: Chuan-Tsai Hou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 378 days.

(21) Appl. No.: 12/789,767

(22) Filed: May 28, 2010

(65) Prior Publication Data

US 2011/0243713 A1  Oct. 6, 2011

(30) Foreign Application Priority Data

Mar. 30, 2010 (CN) .......................... 2010 1 0136129

(51) Int. Cl.
*G05B 11/28* (2006.01)

(52) U.S. Cl. ........ 318/599; 318/471; 318/472; 318/473; 388/811; 388/825; 361/695; 165/244

(58) Field of Classification Search .................. 318/599, 318/400.01, 799, 471, 472, 473; 310/40.5, 310/62, 63; 361/679.48, 695; 123/392, 339.18; 165/244; 388/811, 825

See application file for complete search history.

(56) References Cited

U.S. PATENT DOCUMENTS

| 7,211,977 | B2 * | 5/2007 | Squibb ...................... 318/400.08 |
| 7,313,466 | B2 * | 12/2007 | Chang ........................... 700/300 |
| 7,702,223 | B2 * | 4/2010 | Qian et al. ..................... 388/825 |
| 7,983,539 | B2 * | 7/2011 | Pan .............................. 388/811 |
| 8,055,124 | B2 * | 11/2011 | Pan .............................. 388/811 |
| 8,217,614 | B2 * | 7/2012 | Yuan et al. .................... 318/472 |
| 2010/0145548 | A1 * | 6/2010 | Ou et al. ....................... 700/300 |

* cited by examiner

*Primary Examiner* — Antony M Paul
(74) *Attorney, Agent, or Firm* — Altis Law Group, Inc.

(57) ABSTRACT

A fan control circuit includes a first switch element, a second switch element, and a fan connector. A first control terminal of the first switch element is connected to a fan control terminal to receive a pulse width modulation signal. A first terminal of the first switch element is connected to a first voltage source. A second control terminal of the second switch element is connected to the first terminal of the first switch element. A fourth terminal of the second switch is connected to a second voltage source via a NTC resistor. A first pin of the fan connector is connected to ground. A second pin of the fan connector is connected to a third terminal of the second switch element. A third pin of the fan connector is connected to a signal receiving terminal. The third pin is configured to receive a feedback signal indicating a rotating speeding of the fan.

19 Claims, 2 Drawing Sheets

FAN CONTROL CIRCUIT

BACKGROUND

1. Technical Field

The present disclosure relates to control circuits, especially to a control circuit for a fan.

2. Description of Related Art

An electronic device usually requires cooling of the power supply and/or one or more components of the device. Traditionally, a fan may be used to cool the device where continuous rotation of the fan dissipates unwanted heat away from the device. A fan usually continuously rotates whenever the power supply of the equipment body is turned on, which may lead to undesired results. Unwanted noise from the fan rotation may be present in an environment where quietness is required. Additionally, continuous rotation of the fan will inevitably lead to accelerated deterioration of the equipment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
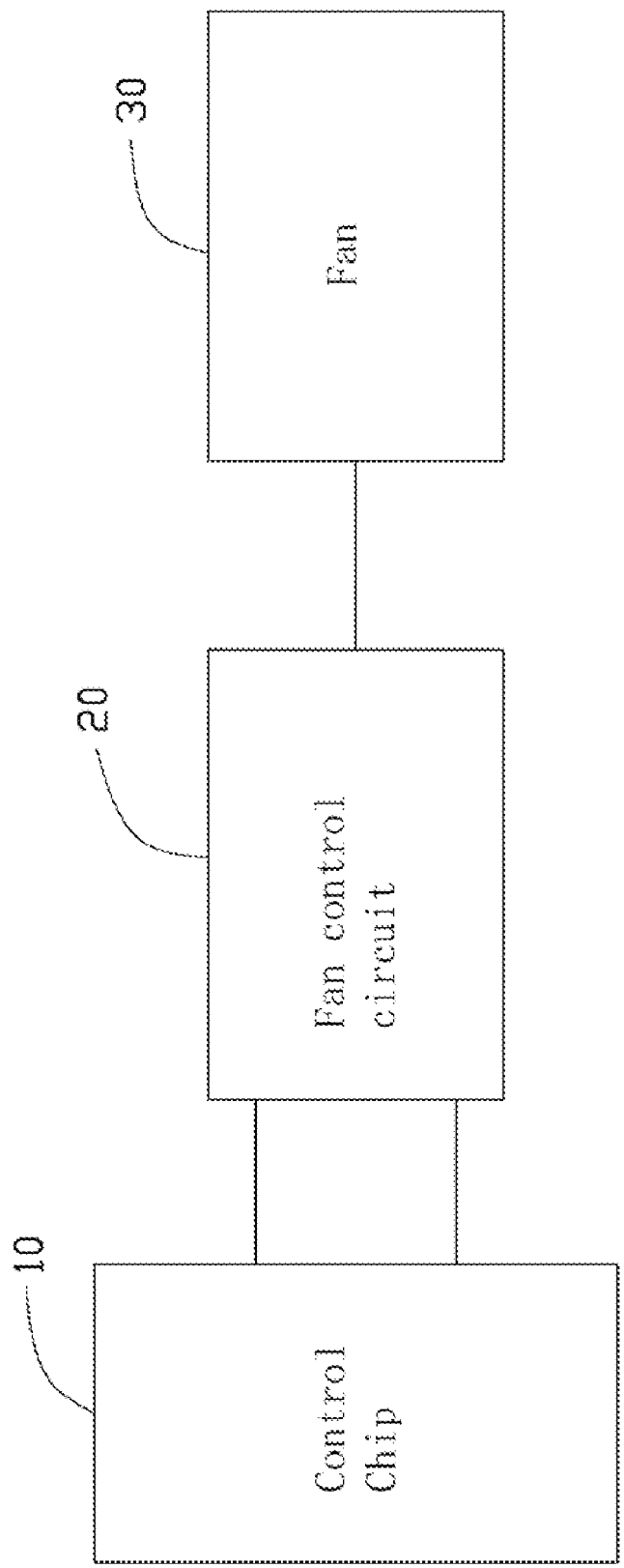
FIG. 1 is a sketch view of a fan control circuit in accordance with an embodiment, connected between a control chip and a fan.

Referring to FIG. 1, a fan control circuit 20 is applied to control a fan 30 of a CPU. The fan control circuit 20 is connected to a control chip 10.

Figure 2:
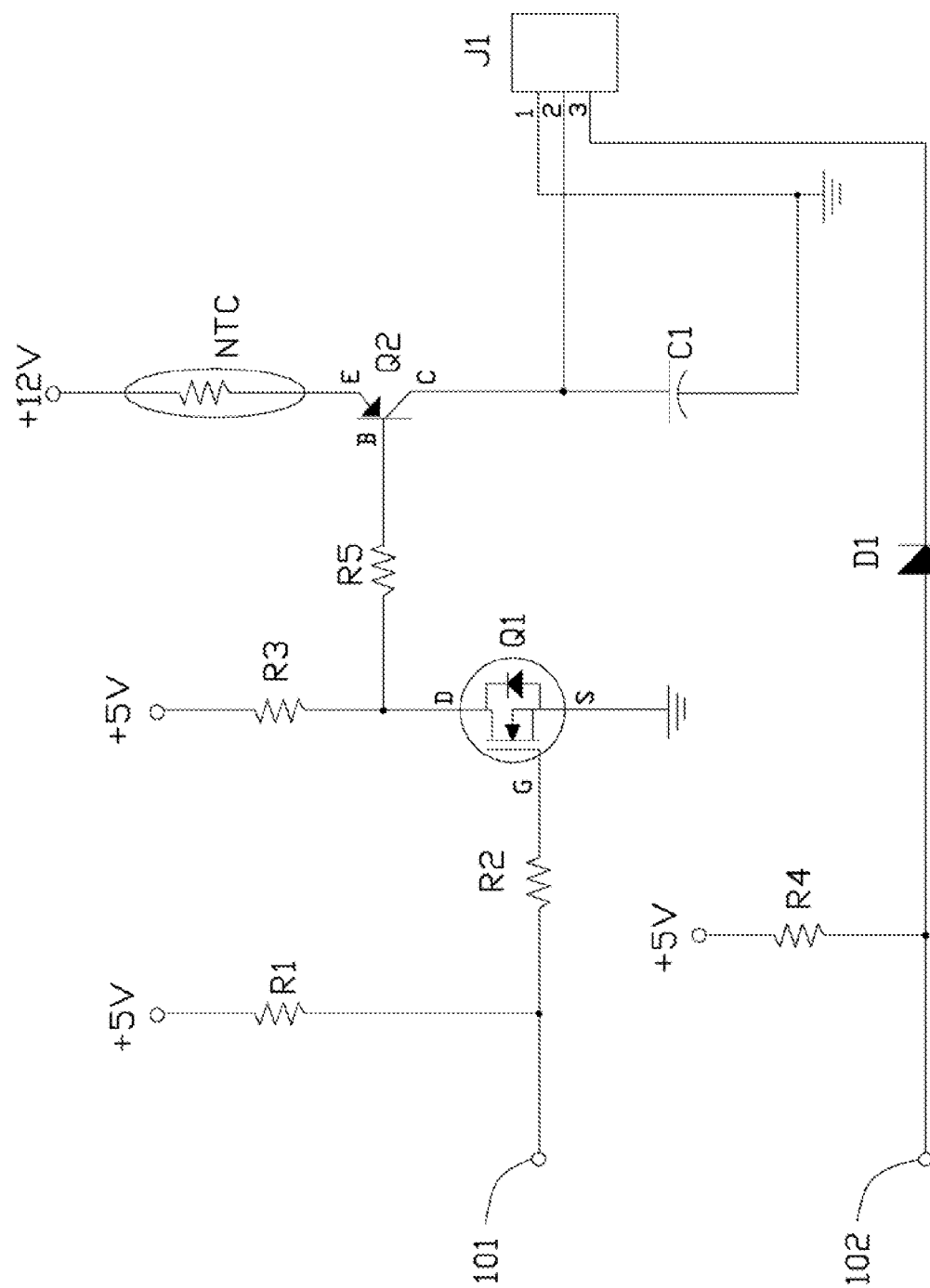
FIG. 2 is a circuit diagram of a fan control circuit in accordance with an embodiment.

Referring to FIGS. 1 and 2, the control chip 10 includes a fan control terminal 101 and a signal receiving terminal 102. The fan control circuit 20 includes a first switch element, a second switch element, and a fan connector J1. In one embodiment, the first switch element is an N-channel metal-oxide-semiconductor (nMOS) transistor Q1, and the second switch element is a pnp transistor Q2.

The nMOS Q1 includes a gate G, a drain D, and a source S. The gate G of the nMOS Q1 is connected to a +5 V voltage source via a resistor R1 and a resistor R2. The terminal of the resistor R2 connected to the resistor R1 is connected to the fan control terminal 101 of the control chip 10. The fan control terminal 101 is configured to output a pulse width modulation (PWM) signal. The drain D of the nMOS Q1 is connected to the +5 V voltage source via a resistor R3.

The pnp transistor Q2 includes a base B, a collector C, and an emitter E. The base B of the pnp transistor Q2 is connected to the drain D of the nMOS Q1 via a resistor R5. The emitter E is connected to a +12 V voltage source via a negative temperature coefficient resistor NTC. The collector C of the pnp transistor Q2 is connected to ground via a capacitor C1. The resistor NTC is used for protecting the pnp transistor Q2 from being damaged by an inrush current.

The fan connector J1 includes a pin 1, a pin 2, and a pin 3. The fan connector J1 is used for connecting the fan control circuit 20 to a fan. The pin 2 is configured to input a startup signal to the fan. The pin 3 is configured to receive a feedback signal from the fan indicating a rotating speeding of the fan.

The pin 1 of the fan connector J1 is connected to ground. The pin 2 of the fan connector J1 is connected to the collector C of the pnp transistor Q2. The pin 3 of the fan connector J1 is connected to a negative pole of a diode D1. A positive pole of the diode D1 is connected to the signal receiving terminal 102, and is connected to the +5 V voltage source via a resistor R4. The signal receiving terminal 102 is configured to receive a rotating speed signal of the fan 30.

When the control chip 10 is operating, the fan control terminal 101 of the control chip 10 outputs a PWM signal to the nMOS Q1. The voltage signal at the drain D can be an increased voltage signal or a decreased voltage signal opposite to a corresponding change in the duty cycle of the PWM signal. The voltage signal at the drain D is transmitted to the pnp transistor Q2. If the current of the base B of the pnp transistor Q2 changes, the current changes at the collector C of the pnp transistor Q2 in direct proportion to the current change of the base B. Thus a corresponding change occurs in the voltage signal at the collector C of the pnp transistor Q2. Therefore, the voltage signal at the collector C of the pnp transistor Q2 can be an increased voltage signal or a decreased voltage signal according to a corresponding change in the duty cycle of the PWM signal. Because the change of the rotating speed of the fan 30 is in direct proportion to the change of the voltage signal of the collector C of the pnp transistor Q2, the rotating speed of the fan 30 is thus controlled by the PWM signal.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A fan control circuit, comprising:
   a first switch element, the first switch element comprising a first control terminal, a first terminal, and a second terminal; the first control terminal connected to a fan control terminal, the fan control terminal configured to output a pulse width modulation signal, and the first terminal connected to a first voltage source;
   a second switch element, the second switch element comprising a second control terminal, a third terminal, and a fourth terminal; the second control terminal of the second switch element connected to the first terminal of the first switch element, and the fourth terminal of the second switch element connected to a second voltage source via a negative temperature coefficient resistor; and
   a fan connector configured to connect to a fan, the fan connector comprising a first pin, a second pin and a third pin; the first pin connected to ground, the second pin connected to the third terminal of the second switch element, the second pin configured to input startup signal to the fan if the second pin is at high level, the third pin connected to a signal receiving terminal, and the third pin configured to receive a feedback signal from the fan indicating a rotating speeding of the fan;
   wherein the second pin is at high level if the pulse width modulation signal is a high level signal, and the second pin is at low level if the pulse width modulation signal is a low level signal.

2. The fan control circuit of claim 1, wherein the third terminal of the second switch element is connected to ground via a capacitor.

3. The fan control circuit of claim 1, wherein the second control terminal of the second switch element is connected to the first terminal of the first switch element via a resistor.

4. The fan control circuit of claim 1, wherein the first terminal of the first switch element is connected to the first voltage source via a resistor.

5. The fan control circuit of claim 1, wherein the first control terminal of the first switch element is connected to the fan control terminal via a resistor.

6. The fan control circuit of claim 1, wherein the fan control terminal is connected to a third voltage source via a resistor.

7. The fan control circuit of claim 1, wherein the third pin is connected to a negative pole of a diode, a positive pole of the diode is connected to the signal receiving terminal, and the positive pole is connected to a third voltage source via a resistor.

8. The fan control circuit of claim 1, wherein the first switch element is an N-channel MOS transistor, the first control terminal of the first switch element is a gate of the N-channel MOS transistor, the first terminal of the first switch element is a drain of the N-channel MOS transistor, and the second terminal of the first switch element is a source of the N-channel MOS transistor.

9. The fan control circuit of claim 1, wherein the second switch element is a pnp transistor, the second control terminal of the second switch element is a base of the pnp transistor, the third terminal of the second switch element is a collector of the pnp transistor, and the fourth terminal of the second switch element is an emitter of the pnp transistor.

10. A fan control circuit, comprising:
a switch circuit connected to a fan control terminal, the fan control terminal configured to output a pulse width modulation signal; and
a fan connector configured to connect to a fan, the fan connector comprising a first pin, a second pin and a third pin; the first pin connected to ground, the second pin connected to the switch circuit, and the third pin connected to a signal receiving terminal; the second pin configured to input a startup signal to the fan, and the third pin configured to receive a feedback signal from the fan indicating a rotating speeding of the fan;
wherein the pulse width modulation signal is configured to control the fan via the switch circuit; the switch circuit comprises a first switch element and a second switch element; the first switch element comprising a first control terminal, a first terminal, and a second terminal; the first control terminal connected to the fan control terminal, the first terminal connected to a first voltage source; and the second switch element comprising a second control terminal, a third terminal, and a fourth terminal, the second control terminal of the second switch element connected to the first terminal of the first switch element, and the fourth terminal of the second switch element connected to a second voltage source.

11. The fan control circuit of claim 10, wherein the fourth terminal of the second switch element is connected to the second voltage source via a negative temperature coefficient resistor.

12. The fan control circuit of claim 10, wherein the third terminal of the second switch element is connected to ground via a capacitor.

13. The fan control circuit of claim 10, wherein the second control terminal of the second switch element is connected to the first terminal of the first switch element via a resistor.

14. The fan control circuit of claim 10, wherein the first terminal of the first switch element is connected to the first voltage source via a resistor.

15. The fan control circuit of claim 10, wherein the first control terminal of the first switch element is connected to the fan control terminal via a resistor.

16. The fan control circuit of claim 10, wherein the fan control terminal is connected to a third voltage source via a resistor.

17. The fan control circuit of claim 10, wherein the third pin is connected to a negative pole of a diode, a positive pole of the diode is connected to the signal receiving terminal, and the positive pole is connected to a third voltage source via a resistor.

18. The fan control circuit of claim 10, wherein the first switch element is an N-channel MOS transistor, the first control terminal of the first switch element is a gate of the N-channel MOS transistor, the first terminal of the first switch element is a drain of the N-channel MOS transistor, and the second terminal of the first switch element is a source of the N-channel MOS transistor.

19. The fan control circuit of claim 10, wherein the second switch element is a pnp transistor, the second control terminal of the second switch element is a base of the pnp transistor, the third terminal of the second switch element is a collector of the pnp transistor, and the fourth terminal of the second switch element is an emitter of the pnp transistor.

* * * * *